United States Patent
Mustajärvi et al.

(10) Patent No.: US 6,661,782 B1
(45) Date of Patent: *Dec. 9, 2003

(54) ROUTING AREA UPDATING IN PACKET RADIO NETWORK

(75) Inventors: Jari Mustajärvi, Espoo (FI); Ismo Kangas, Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/341,301

(22) PCT Filed: Jan. 19, 1998

(86) PCT No.: PCT/FI98/00041

§ 371 (c)(1),
(2), (4) Date: Jul. 8, 1999

(87) PCT Pub. No.: WO98/32304

PCT Pub. Date: Jul. 23, 1998

(30) Foreign Application Priority Data

Jan. 20, 1997 (FI) .................................................. 970238

(51) Int. Cl.[7] .............................. H04Q 7/00; H04Q 7/28
(52) U.S. Cl. ........................ 370/331; 370/328; 370/341
(58) Field of Search ................................. 370/328, 346, 370/349, 403, 258, 34.1, 457, 324, 329, 331, 453

(56) References Cited

U.S. PATENT DOCUMENTS

| 4,782,519 | A | 11/1988 | Patel et al. |
| 4,989,204 | A | 1/1991 | Shimizu et al. |
| 5,412,660 | A | 5/1995 | Chen et al. |
| 5,530,963 | A | 6/1996 | Moore et al. |

(List continued on next page.)

FOREIGN PATENT DOCUMENTS

| EP | 320 820 | 6/1989 |
| WO | 95/16330 | 6/1995 |
| WO | 96/33586 | 10/1996 |
| WO | 97/00568 | 1/1997 |
| WO | 97/21313 | 6/1997 |

OTHER PUBLICATIONS

Mouly and Pautet, "THe GSM System for Mobile Communications," France, 1992.

(List continued on next page.)

Primary Examiner—Nguyen T. Vo
Assistant Examiner—S. Smith
(74) Attorney, Agent, or Firm—Pillsbury Winthrop LLP

(57) ABSTRACT

The invention relates to a cellular packet radio. network and to a method for updating a routing area in a packet radio network. Packet radio support nodes (SGSN) are connected to a digital cellular radio network (BSS), which provides a radio interface for the support nodes for packet-switched data transmission between the support nodes and mobile stations. There is a logical link between a mobile station (MS) and a serving packet radio support node (SGSN). The packet radio network utilizes logical routing areas, each of which comprises one or more cells. Each cell broadcasts information on the routing area to which it belongs. The mobile station sends a routing area update request to the packet radio network when it roams to a new cell which belongs to a different routing area than the old cell. The update request includes the identifiers of the old and new routing area. When the packet radio node detects a routing area update carried out by an unknown mobile station, it sends information on the change of the packet radio node to the mobile station (9, 12). The mobile station then starts a local procedure in the mobile station a network-level procedure (13, 14) with the new support node in order to update the logical link between them for data transmission.

26 Claims, 3 Drawing Sheets

U.S. PATENT DOCUMENTS

| | | | | |
|---|---|---|---|---|
| 5,548,586 A | * | 8/1996 | Kito et al. | 370/349 |
| 5,590,124 A | * | 12/1996 | Robins | 370/258 |
| 5,729,537 A | | 3/1998 | Billstrom | |
| 5,889,770 A | * | 3/1999 | Jokiaho et al. | 370/337 |
| 6,006,091 A | * | 12/1999 | Lupien | 455/414 |
| 6,073,015 A | * | 6/2000 | Berggren et al. | 455/432 |
| 6,356,759 B1 | * | 3/2002 | Mustajarvi | 379/346 |
| 6,430,163 B1 | * | 8/2002 | Mustajarvi | 370/310 |
| 6,512,756 B1 | * | 1/2003 | Mustajarvi et al. | 370/341 |

OTHER PUBLICATIONS

Jari Hamalainen, Hannu H. Kari, "Proposed Opereation of GSM Packet Radio Networks," The sixth IEEE Int. Symposium on Personal, Indoor and Mobile Radio Communications, PIMRC '95, pp. 372–377, 1995.

Sudarshan Rao et al.: "Interworking Between Digital European Cordless Telecommunications and a Distributed Packet Switch," Wireless Networks 1 (1995) pp. 83–93, Science Publishers, p. 90–p. 92.

* cited by examiner

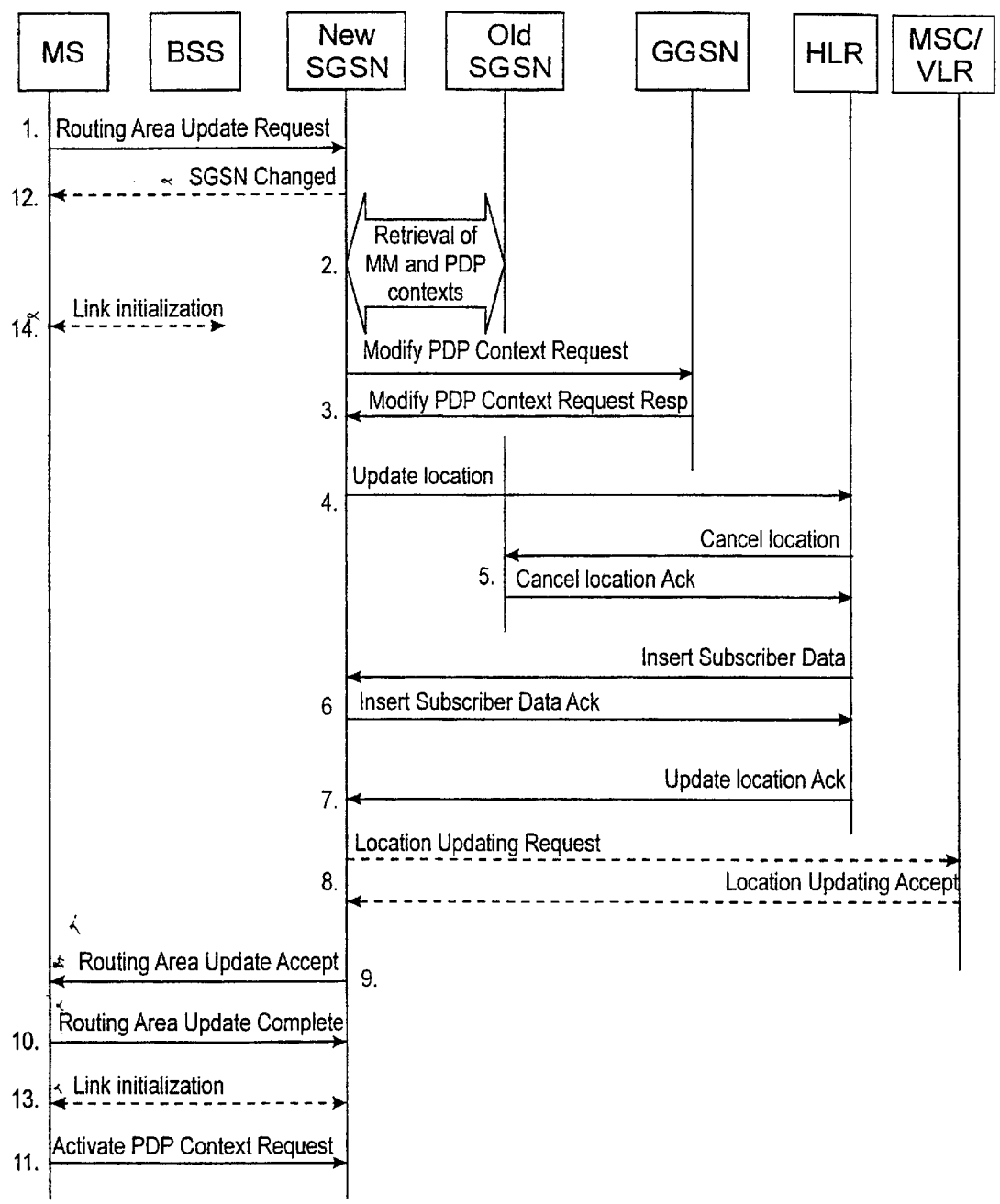

ROUTING AREA UPDATING IN PACKET RADIO NETWORK

This application is the national phase of international application PCT/FI98/00041 filed Jan. 19, 1998 which designated the U.S.

FIELD OF THE INVENTION

The invention relates to packet radio networks in general, and in particular to supporting mobility in packet radio networks.

BACKGROUND OF THE INVENTION

Mobile communication systems have been developed because it has been necessary to be able to reach people even when they are not close to a fixed telephone terminal. As the use of various data transmission services in offices has increased, different data services have also been introduced into mobile communication systems. Portable computers enable effective data processing wherever the user moves. Mobile communication networks in turn provide an effective access network to actual data networks for the user for mobile data transmission. To realize this, data services of new kind are designed for existing and future mobile communication networks. Mobile data transmission is supported particularly well by digital mobile communication systems, such as the pan-European mobile communication system GSM (Global System for Mobile Communication).

The general packet radio service GPRS is a new service in the GSM system, and is one of the objects of the standardization work of the GSM phase 2+ at ETSI (European Telecommunication Standard Institute). The GPRS operational environment comprises one or more subnetwork service areas, which are interconnected by a GPRS backbone network. A subnetwork comprises a number of packet data service SN, which in this application will be referred to as serving support nodes SGSN, each of which is connected to the GSM mobile communication network (typically to base station systems) in such a way that it can provide a packet service for mobile data terminals via several base stations, i.e. cells. The intermediate mobile communication network provides packet-switched data transmission between a support node and mobile data terminals. Different subnetworks are in turn connected to an external data network, e.g. to a public switched data network PSPDN, via GPRS gateway support nodes GGSN. The GPRS service thus allows to provide packet data transmission between mobile data terminals and external data networks when the GSM network functions as an access network. The GPRS network architecture is illustrated in FIG. 1.

In the GPRS system, layered protocol structures, known as a transmission level and a signalling level, have been defined for transmitting user information and signalling. A transmission level has a layered protocol structure providing transmission of user information together with control procedures of data transmission related to it (e.g. flow control, error detection, error correction and error recovery). A signalling level consists of protocols which are used for controlling and supporting the functions of the transmission level, such as controlling access to the GPRS network (Attach and Detach) and controlling the routing path of the established network connection in order to support the user's mobility. FIG. 2 illustrates the signalling level of the GPRS system between an MS and an SGSN. The protocol layers of the transmission level are identical with those of FIG. 2 up to protocol layer SNDCP, above which there is a protocol of the GPRS backbone network (e.g. Internet Protocol IP) between the MS and the GGSN (instead of protocol L3MM). The protocol layers illustrated in FIG. 2 are:

Layer 3 Mobility Management (L3MM): This protocol supports the functionality of mobility management, e.g. GPRS Attach, GPRS Detach, security, routing update, location update, activation of a PDP context, and deactivation of a PDP context.

Subnetwork Dependent Convergence Protocol (SNDCP) supports transmission of protocol data units (N-PDU) of a network layer between an MS and an SGSN. The SNDCP layer, for example, manages ciphering and compression of N-PDUs.

Logical Link Control (LLC); this layer provides a very reliable logical link. The LLC is independent of the radio interface protocols mentioned below.

LLC Relay: This function relays LLC protocol data units (PDU) between an MS-BSS interface (Um) and a BSS-SGSN interface (Gb).

Base Station Subsystem GPRS Protocol (BSSSGP): This layer transmits routing information and information related to QoS between a BSS and an SGSS.

Frame Relay, which is used over the Gb interface. A semipermanent connection for which several subscribers' LLC PDUs are multiplexed is established between the SGSN and the BSS.

Radio Link Control (RLC): This layer provides a reliable link independent of radio solutions.

Medium Access Control (MAC): This one controls access signalling (request and grant) related to a radio channel and mapping of LLC frames onto a physical GSM channel.

With respect to the invention the most interesting protocol layers are the LCC and L3MM. The function of the LLC layer can be described as follows: the LLC layer functions above the RLC layer in the reference architecture and establishes a logical link between the MS and its serving SGSN. With respect to the function of the LCC the most important requirements are a reliable management of LCC frame relay and support for point-to point and point-to-multipoint addressing.

The service access point (SAP) of the logical link layer is a point where the LLC layer provides services for the protocols of layer 3 (SNDCP layer in FIG. 2). The link of the LLC layer is identified with a data link connection identifier (DLCI), which is transmitted in the address field of each LLC frame. The DLCI consists of two elements: Service Access Point Identifier (SAPI) and Terminal End Point Identifier (TEI). The TEI identifies a GPRS subscriber and is usually a Temporary Logical Link Identity TLLI. The TEI can also be another subscriber identity, such as an international mobile subscriber identity IMSI, but usually transmission of the IMSI on the radio path is avoided.

When a user attaches to a GPRS network, a logical link is established between the MS and the SGSN. Thus it can be said that the MS has a call in progress. This logical link has a route between the MS and the SGSN, indicated with the TLLI identifier. Thus the TLLI is a temporary identifier, the SGSN of which allocates for a certain logical link and IMSI. The SGSN sends the TLLI to the MS in connection with the establishment of a logical link, and it is used as an identifier in later signalling and data transmission over this logical link.

Data transmission over a logical link is carried out as explained in the following. The data to be transmitted to or from an MS is processed with an SNDCP function and transmitted to the LLC layer. The LLC layer inserts the data in the information field of LLC frames. The address field of a frame includes e.g. a TLLI. The LLC layer relays the data to the RLC, which deletes unnecessary information and segments the data into a form compatible with the MAC. The MAC layer activates radio resource processes in order to obtain a radio traffic path for transmission. A corresponding MAC unit on the other side of the radio traffic path receives the data and relays it upwards to the LLC layer. Finally, the data is transmitted from the LLC layer to the SNDCP, where the user data is restored completely and relayed to the next protocol layer.

The LLC layer controls transmission and retransmission of LLC frames over a logical link. Several state variables are related to the controlling at both ends of the link. In multiframe transmission such state variables include e.g. a transmission state variable V(S), acknowledgement state variable V(A), transmission sequence number N(S), receiving state variable V(R), and receiving sequence number N(R). The V(S) indicates the number of the frame to be transmitted next. The V(A) indicates the number of the last frame the opposite end has acknowledged. The V(S) shall not exceed the V(A) by more than k frames, i.e. the size of the transmission window is k. The V(R) indicates the number of the next frame that is expected to be received. The state variables are reset, i.e. set to value 0 when logical link is being established. This is performed by using the following messages of the LAPG (Link Access Procedure on the "G" channel) protocol: SABM (Set Asynchronous Balanced Mode) and UA (Unnumbered Acknowledgement) or SAUM (Set Asynchronous Unbalanced Mode).

Three different MM states of the MS are typical of the mobility management (MM) of a GPRS subscriber: idle state, standby state and ready state. Each state represents a certain functionality and information level, which has been allocated to the MS and SGSN. Information sets related to these states, called MM contexts, are stored in the SGSN and MS. The context of the SGSN contains subscriber data, such as the subscriber's IMSI, TLLI and location and routing information, etc.

In the idle state the MS cannot be reached from the GPRS network, and no dynamic information on the current state or location of the MS, i.e. on the MM context, is maintained in the network. Neither does the MS receive nor transmit data packets, in consequence of which no logical link has been established between the SGSN and the MS. If the MS is a dual-mode terminal, i.e. it can function both in the GPRS network and in the GSM network, it can be in the GSM network when functioning in the GPRS idle state. The MS can switch from the idle state to the ready state by attaching to the GPRS network, and from the standby or ready state to the idle state by detaching from the GPRS network.

In the standby and ready states the MS is attached to the GPRS network. In the GPRS network, a dynamic MM context has been created for the MS, and a logical link LLC (Logical Link Control) established between the MS and the SGSN in a protocol layer. The ready state is the actual data transmission state, in which the MS can transmit and receive user data. The MS switches from the standby state to the ready state either when the GPRS network pages the MS or when the MS initiates data transmission or signalling. The MS may remain in the ready state (for a period set with a timer) even when no user data is transmitted nor signalling performed.

In the standby and ready states the MS also has one or more PDP contexts (Packet Data Protocol), which are stored in the serving SGSN in connection with the MM context. The PDP context defines different data transmission parameters, such as the PDP type (e.g. X.25 or IP), PDP address (e.g. X.121 address), quality of service QoS and NSAPI. The MS activates the PDU context with a specific message, Activate PDP Context Request, in which it gives information on the TLLI, PDP type, PDP address, required QoS and NSAPI. When the MS roams to the area of a new SGSN, the new SGSN requests MM and PDP contexts from the old SGSN.

For mobility management, logical routing areas have been defined to the GPRS network. A routing area RA is an area defined by an operator, comprising one or more cells. Usually, one SGSN serves several routing areas. A routing area is used for determining the location of the MS in the standby state. If the location of the MS is not known in terms of a specific cell, signalling is started with a GPRS page within one routing area RA.

The MS performs a routing area update procedure in order to support mobility of a packet-switched logical link. In the READY state the MS initiates the procedure when a new cell is selected, the routing area changes or the update timer of a cyclic routing area expires. The radio network (PLMN) is arranged to transmit a sufficient amount of system information to the MS so that it can detect when it enters a new cell or a new routing area RA and to determine when it is to carry out cyclic routing area updates. The MS detects that it has entered a new cell by comparing cyclically the cell identity (Cell ID) which is stored in its MM context with the cell identity which is received from the network. Correspondingly, the MS detects that it has entered a new routing area RA by comparing the routing area identifier stored in its MM context with the routing area identifier received from the network. When the MS selects a new cell, it stores the cell identity and routing area in its MM context.

All the procedures described above (e.g. attach, detach, routing area update and activation/deactivation of the PDP context) for creating and updating MM and PDP contexts and establishing a logical link are procedures activated by the MS. In connection with a routing area update the MS, however, carries out an update to the new routing area without being able to conclude on the basis of the routing area information broadcast by cells whether the SGSN serving the new cell is the same as the SGSN that served the old cell. On the basis of the old routing area information transmitted by the MS in an update message the new SGSN detects that a routing area update is in progress between SGSNs and activates necessary interrogations to the old SGSN in order to create new MM and PDP contexts for the MS to the new SGSN. Since the SGSN has changed, the logical link should be re-established between the MS and the new SGSN. The problem is; however, that the MS does not know that the SGSN has changed. Instead, the MS may transmit data to the new SGSN, which is not able to unpack the data before MM and PDP contexts have been created on the basis of the inquiry made to the old SGSN. Furthermore, even though the contexts were already created in the new SGSN, state variables at the ends of the logical link do not match and data transmission fails, at least temporarily. If the retrieval of PDP contexts from the old SGSN fails, data transmission is prevented, since the new SGSN does not serve according to the PDP context activated earlier by the MS. The MS, however, has no information on such a situation, and it cannot start reactivation of the PDP context.

DISCLOSURE OF THE INVENTION

An object of the invention is to minimise and eliminate the problems and disadvantages resulting from the routing area update.

The invention relates to a method for updating a routing area in a packet radio network, the method comprising the steps of
  establishing a logical link between a mobile station and a first radio support node via a radio cell,
  selecting a second radio cell in the mobile station, the routing area identifier broadcast by the cell being different from the routing area identifier of the first radio cell,
  sending a routing area update request to the second packet radio support node serving the second cell from the mobile station,
  detecting in the second packet radio support node that the mobile station has roamed from a routing area served by a different packet radio support node,
  requesting subscriber data related to the mobile station from the first packet radio support node,
  sending an acknowledgement message on the routing area update from the second packet radio support node to the mobile station. The method is characterized by
  sending information on the change of the packet radio support node from the second packet radio support node to the mobile station,
  initiating a local procedure or a network procedure for initializing a logical link between the mobile station and the second packet radio support node in the mobile station in response to the reception of said information.

The invention further relates to packet radio networks as claimed in claims 14 and 23 and to a method as claimed in claim 20.

The basic idea of the invention is that a serving packet radio support node, which detects a routing area update by an unknown mobile station, transmits information on the change of the serving packet radio support node to the mobile station. In response to the change of the support node information received from the packet radio support node the mobile station initiates a local procedure in the mobile station, or a network-level procedure with the new support node, in order to update the logical link between them for data transmission.

A local procedure may comprise resetting of the state variables of the logical link and changing the link identifier in the mobile station. Default values, for example, can be used for other possible link parameters. In that case the serving support node initializes a logical link independently at its own end when transmitting said information on the change of the support node. This allows to minimize signalling over the radio interface and to speed up the update of the logical link. Information on the change of the support node is transmitted preferably in an existing signalling message, e.g. in the response message on the routing area update in the mobility management protocol layer. Thus the link can be updated completely without additional signalling. A further advantage resulting from the transmission of said information in a protocol layer above the logical link layer, e.g. in the mobility management protocol layer, and the local initialization of the link in the mobile station is that the establishment of a logical link is totally independent of the protocols of the logical link layer and their possible defects.

A network-level procedure may comprise, for example, the mobile station initiating a procedure similar to the one initiated when the mobile station attached to the network for the first time in order to establish a logical link. This requires additional signalling and is slower compared to the local procedure described above. One possible advantage, however, is that the link is established in the same way in all situations. Furthermore, all necessary link parameters may be negotiated between the support node and the mobile station. The mobile station may also use the signalling of a logical link protocol layer for controlling the support node so that it resets its state variables and initializes a logical link. In that case the mobile station resets its own state variables and initializes a logical link at its own end after it has received an acknowledgement message from the support node. An example of such a message pair is the SABM message of the LAPG protocol of the GPRS system and its acknowledgement message UA. Another preferred solution is to apply the negotiation procedure of the LLC link parameters of the GPRS system in such a way that the mobile station sends a XID command including a parameter message. The support node sends a XID reply message including a list of the parameters it supports. If resetting of state variables according to the invention is included in this, as a consequence of the XID reply message or as an immediate consequence of the reception of said information on the change of the support node, desirable link parameters can be provided with very little signalling.

In a further embodiment of the invention information on the basis of which a mobile station can conclude whether a new cell or routing area is related to the same packet radio support node as the old cell or routing area or to a different one is transmitted on the broadcast control channel of the cells of a packet radio network. In both cases the mobile station sends a routing area update request. If the mobile station detects that the packet radio support node has changed, it initiates the above-mentioned local procedure or network procedure for updating the logical link between the mobile station and the new packet radio support node at some point after the mobile station has sent the request for a routing area. Information on the packet radio support node is preferably inserted in the routing area information or location area information transmitted on the broadcast control channel, but it can also be inserted otherwise. This information can be an identifier which identifies a packet radio support node uniquely or a "colour code", adjacent packet radio support nodes always having different colour codes. An advantage of the colour code is that it can be inserted in a very small number of bits (compared with the identifier), and thus it does not use much of valuable radio interface resources. The mobile station can also utilize the support node information transmitted on the broadcast control channel on deciding to which cell it would be worth roaming. The mobile station can, for example, select the cell having a weaker signal strength from two cells on the basis of signal strength measurements if that cell is within the area of the same packet radio support node as the current serving packet radio support node. Using the support node information as a criterion for deciding on crossover allows to avoid unnecessary change-overs between the packet radio support nodes and the signalling load due to change-overs on the radio path and between the packet network elements.

As was stated above, in some exceptional situations the packet data protocol context (PDP) cannot be retrieved for the new support node from the old support node. This may result e.g. from the fact that the new support node does not recognize the old support node or cannot contact it, or the old support node has lost the subscriber data. In that case, in one preferred embodiment of the invention, the new support node sends information to the mobile station that it should initiate the activation procedure of one or more PDP contexts. This information can be relayed as included in the information on the change of the support node or as separate information. Without this procedure the new support node cannot function in the way defined earlier by the mobile station, and data transmission is prevented at least temporarily without the mobile station detecting this.

According to an embodiment of the invention, the new support node sends information on the change of the support node to the mobile station immediately after having detected the situation and before subscriber data have been retrieved from the old support node or subscriber data base. An advantage resulting from this is that the mobile station does not try to transmit more data packets since it thinks that it still has a link to the old support node. Furthermore, the update of the logical link can be initiated as early as possible, which speeds up the initiation of data transmission after subscriber data have been received in the support node.

The invention provides an effective way for re-establishing a logical link between support nodes in connection with a routing area update. The invention allows to completely avoid the update of the logical link and interruptions to data transmission in connection with an intra-support node routing area update. The last-mentioned problem would arise, for example, in such a solution in which the mobile station would always initiate the re-establishment of a logical link in connection with a routing area update as a precaution.

BRIEF DESCRIPTION OF THE DRAWINGS

In the following, the invention will be described in greater detail by means of preferred embodiments with reference to the accompanying drawings, in which FIG. 3 is a signalling diagram illustrating a routing area update according to the invention.

PREFERRED EMBODIMENTS OF THE INVENTION

The present invention can be applied to packet radio systems of various kind. The invention can be especially preferably used for providing a general packet radio service GPRS in the pan-European digital mobile communication system GSM (Global System for Mobile Communication) or in corresponding mobile communication systems, such as DCS1800 and PCS (Personal Communication System). In the following, the preferred embodiments of the invention will be described by means of a GPRS packet radio network formed by the GPRS service and the GSM system without limiting the invention to this particular packet radio system.

Figure 1:
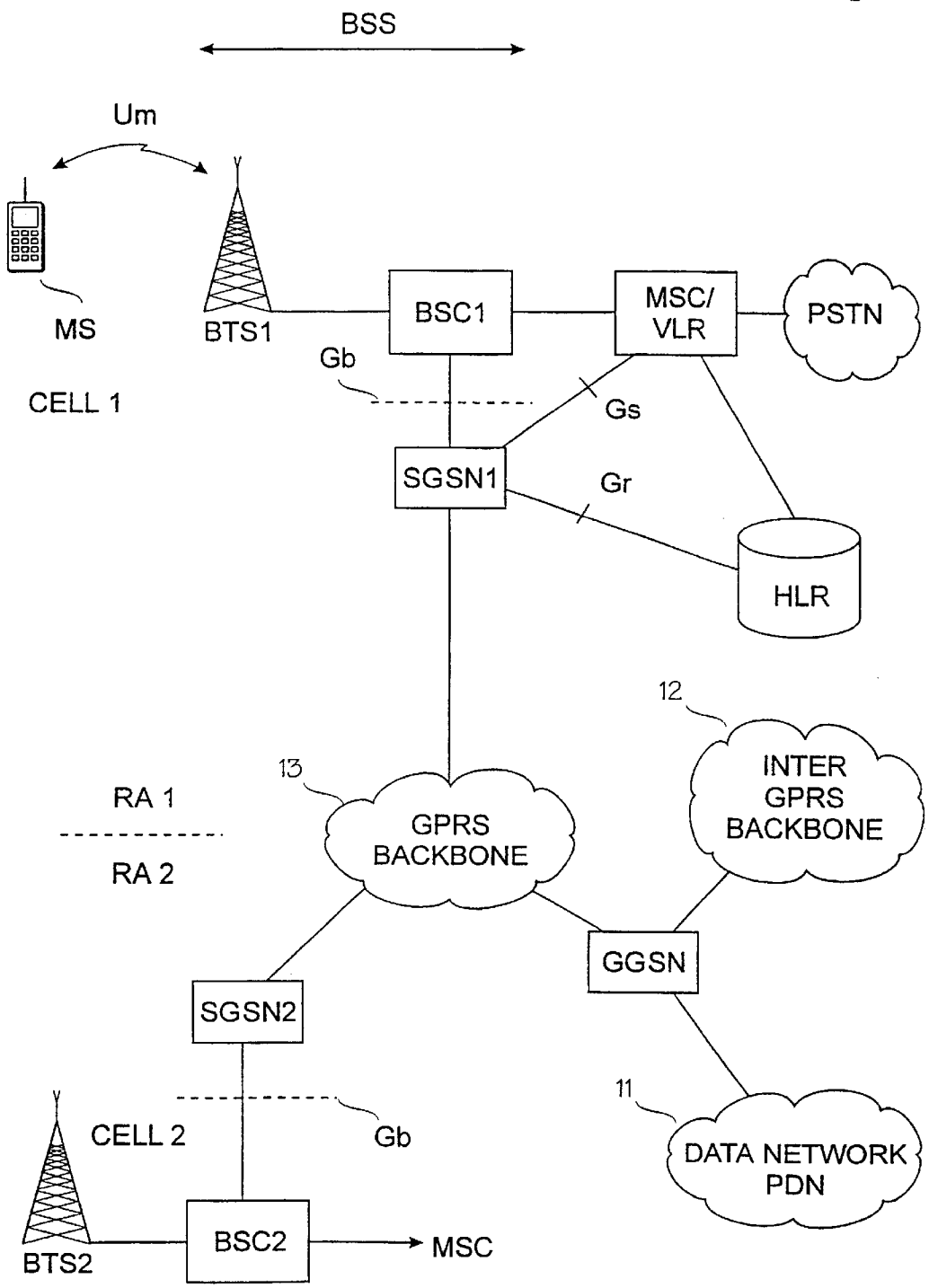
FIG. 1 illustrates GPRS network architecture.
Figure 2:
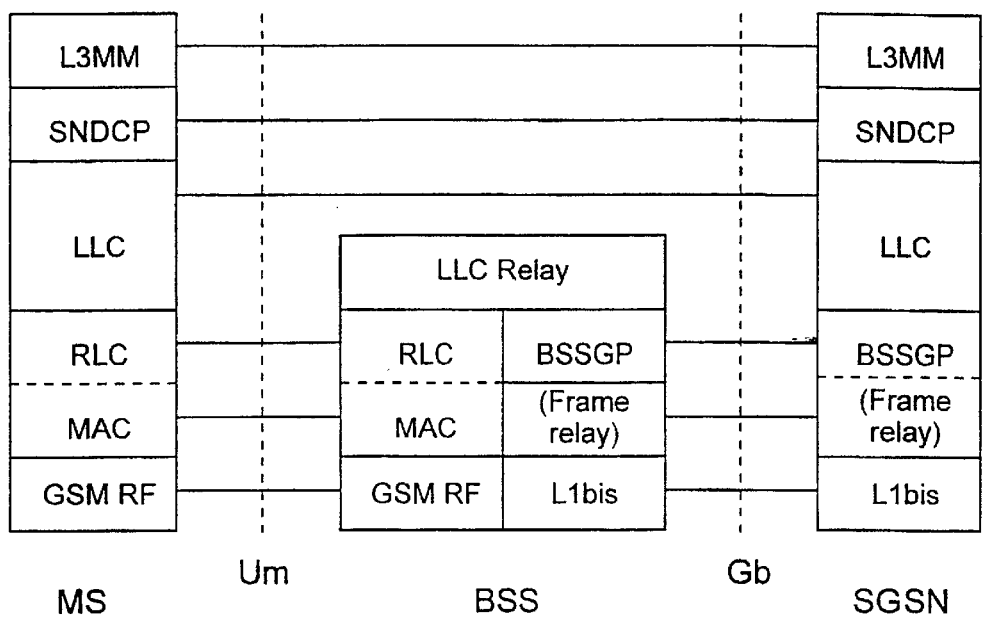
FIG. 2 illustrates protocol layers of the signalling level between an MS and an SGSN.

FIG. 1 illustrates a GPRS packet radio network implemented in the GSM system.

The basic structure of the GSM system comprises two elements: a base station system BSS and a network subsystem NSS. The BSS and mobile stations MS communicate over radio links. In the base station system BSS each cell is served by a base station BTS. A number of base stations are connected to a base station controller BSC, which controls the radio frequencies and channels used by the BTS. Base station controllers BSC are connected to a mobile services switching centre MSC. As regards a more detailed description of the GSM system, reference is made to the ETSI/GSM recommendations and The GSM System for *Mobile Communications*, M. Mouly and M. Pautet, Palaiseau, France, 1992, ISBN:2-957190-07-7.

In FIG. 1 the GPRS system connected to the GSM network comprises one GPRS network, which in turn comprises two serving GPRS support nodes (SGSN) and one GPRS gateway support node (GGSN). The different support nodes SGSN and GGSN are interconnected by an intraoperator backbone network. It is important to realize that in the GPRS network there may be any number of support nodes and gateway support nodes.

The serving GPRS support node SGSN is a node which serves the mobile station MS. Each support node SGSN controls a packet data service within the area of one or more cells in a cellular packet radio network, and therefore, each support node SGSN is connected (Gb interface) to a certain local element of the GSM system. This connection is typically established to the base station system BSS, i.e. to base station controllers BSC or to a base station BTS. The mobile station MS located in a cell communicates with a base station BTS over a radio interface and further with the support node SGSN to the service area of which the cell belongs through the mobile communication network. In principle, the mobile communication network between the support node SGSN and the mobile station MS only relays packets between these two. To realize this the mobile communication network provides packet-switched transmission of data packets between the mobile station MS and the serving support node SGSN. It has to be noted that the mobile communication network only provides a physical connection between the mobile station MS and the support node SGSN, and thus its exact function and structure is not significant with respect to the invention. The SGSN is also provided with a signalling interface Gs to the visitor location register VLR of the mobile communication network and/or to the mobile services switching centre, e.g. signalling connection SS7. The SGSN may transmit location information to the MSC/VLR and/or receive requests for paging a GPRS subscriber from the MSC/VLR.

When the MS attaches to the GPRS network, i.e. in a GPRS attach procedure, the SGSN creates a mobility management context (MM context) containing information related to the mobility and security of the MS, for example. In connection with a PDP activation procedure the SGSN creates a PDP context (packet data protocol) which is used for routing purposes within the GPRS network with the GGSN which the GPRS subscriber uses.

The GPRS gateway support node GGSN connects an operator's GPRS network to other operators' GPRS systems and to data networks 11–12, such as an inter-operator backbone network, IP network (Internet) or x.25 network. The GGSN includes GPRS subscribers' PDP addresses and routing information, i.e. SGSN addresses. Routing information is used for tunneling protocol data units PDU from data network 11 to the current switching point of the MS, i.e. to the serving SGSN. Functionalities of the SGSN and GGSN can be integrated into the same physical node.

The home location register HLR of the GSM network contains GPRS subscriber data and routing information and maps the subscriber's IMSI into one or more pairs of the PDP type and PDP address. The HLR also maps each PDP type and PDP address pair into one or more GGSNs. The SGSN has a Gr interface to the HLR (a direct signalling connection or via an internal backbone network 13). The HLR of a roaming MS may be in a different mobile communication network than the serving SGSN.

An intra-operator backbone network 13, which interconnects an operator's SGSN and GGSN equipment can be implemented, for example, by means of a local network, such as an IP network. It should be noted that an operator's GPRS network can also be implemented without the intra-operator backbone network, e.g. by providing all features in one computer.

An inter-operator backbone network is a network via which different operators' gateway support nodes GGSN can communicate with one another.

In the following, the routing area update in the GPRS network will be described in greater detail. The MS carries out a routing area update procedure in order to support mobility of a packet-switched logical link. The MS initiates the procedure when a new cell is selected and the routing area RA changes, or when the cyclic update timer of a routing area expires. The radio network (PLMN) is arranged to transmit a sufficient amount of system information to the MS so that it can detect when it enters a new cell or routing area RA and to determine when it is to carry out cyclic routing area updates. The MS detects that it has entered a new cell by comparing cyclically the cell identity (Cell ID) which is stored in its MM context with the cell identity which is received from the network. Correspondingly, the MS detects that it has entered a new routing area RA by comparing the routing area identifier stored in its MM context with the routing area identifier received from the network.

When the MS detects a new cell or a new routing area RA, this means that one of the three possible cases is in question: 1) a cell update is needed; 2) a routing area update is needed; and 3) a combined update of a routing area and location area is needed. In all these three cases the MS selects a new cell locally and stores the cell identity in its MM context.

Cell Update Procedure

A cell update is performed when the MS enters a new cell within the current routing area RA and is in the READY state. If the RA has changed, a routing area update is carried out instead of the cell update.

The cell update procedure is carried out as an implicit procedure at the LLC level, which means that normal LLC information and control frames are used for sending information on crossover to the SGSN. In transmission toward the SGSN, the cell identity is added to all LLC frames in the base station system of the network. The SGSN registers the crossover of the MS, and any further traffic toward the MS is routed via a new cell. In a simple cell update the SGSN does not change, and problems overcome by the invention will not arise.

Update Procedure of Routing Area

A routing area is updated when an MS attached to the GPRS network detects that it has entered a new routing area RA, or when the cyclical RA update timer has expired. When the SGSN detects that it is also controlling the old routing area, it finds out that an intra-SGSN routing update is in question. In this case the SGSN has the necessary information on the MS, and it does not need to inform the GGSNs, HLR or MSC/VLR of the new location of the MS. The cyclical RA update is always an intra-SGSN routing area update. In the intra-SGSN routing update procedure the SGSN will not change either, and no problems overcome by the invention will arise.

Inter-SGSN Routing Area Update

In the routing area update procedure between two SGSNs (inter-SGSN) the serving SGSN changes and, according to the invention, the MS should be informed of the change so that the MS can initiate a local procedure or a network procedure for updating a logical link. In the following, the inter-SGSN routing area update according to a first embodiment of the invention will be described with reference to FIG. 3. In the following description the reference numbers refer to messages or events shown in FIG. 3.

1. The MS sends a routing area update request to the SGSN. This message includes the temporary logical link identity TLLI, cell identity of the new cell Cellid, routing area identifier of the old routing area RAid, and routing area identifier of the new routing area RAid. If load is to be decreased in the radio interface, the cell identity Cellid is not added until in the base station system BSS.

2. The new SGSN detects that the old routing area belongs to another SGSN, which will be referred to as an old SGSN in this context. As a result, the new SGSN requests MM and PDP contexts for the MS in question from the old SGSN. All contexts can be requested at the ame time, or the MM context and each PDP context can be requested in different messages. The request (requests) includes at least the routing area identifier RAid of the old routing area and the TLLI. The old SGSN sends in response an MM context, PDP contexts and possibly authorization parameter triplets. If the MS is not recognized in the old SGSN, the old SGSN replies with an appropriate error message. The old SGSN stores the new SGSN address until the old MM context has been deleted so that data packets can be relayed from the old SGSN to the new SGSN.

3. The new SGSN sends a message "Modify PDP Context Request" including e.g. a new SGSN address to the GGSNs concerned. The GGSNs update their PDP context fields and send in response a message "Modify PDP Context Response".

4. The SGSN informs the HLR of the change of the SGSN by sending it a message "Update Location" including a new SGSN address and IMSI.

5. The HLR deletes the MM context from the old SGSN by sending it a message "Cancel Location" including an IMSI. The old SGSN deletes the MM and PDP contexts and acknowledges this by sending a message "Cancel Location Ack".

6. The HLR sends a message "Insert Subscriber Data" including an IMSI and GPRS subscriber data to the new SGSN. The new SGSN acknowledges this by sending a message "Insert Subscriber Data Ack".

7. The HLR acknowledges the location update by sending a message "Update Location Ack" to the SGSN.

8. If the subscriber is also a GSM subscriber (IMSI-Attached), the association between the SGSN and the VLR has to be updated. The VLR address is deduced from the RA information. The new SGSN transmits messages "Location Updating Request" including e.g. an SGSN address and IMSI to the VLR. The VLR stores the SGSN address and acknowledges by sending a message "Location Updating Accept".

9. The new SGSN confirms the presence of the MS in the new routing area RA. If there are no restrictions for registration of the MS for the new RA, the SGSN creates MM and PDP contexts for the MS. A logical link will be established between the new SGSN and the MS. The new SGSN replies to the MS with a message "Routing Area Update-Accept" including e.g. a new TLLI. This message tells to the MS that the network has succeeded in carrying out the update.

In the first embodiment of the invention, information on the changed SGSN will be included in the message "Routing Area Update Accept". This information is preferably a binary field, one state of which shows that the SGSN has changed, and the other state of which shows that the SGSN has not changed. In the Routing Area Update Accept message a 1-bit flag will be sufficient for this purpose.

10. The MS acknowledges the new TLLI with a message "Routing Area Update Complete". The MS also checks whether the SGSN has changed. If the SGSN has not changed (intra-SGSN updating), the MS continues to function normally and does not update the logical link. If the SGSN has changed, the MS initiates a local procedure for updating the LLC link. The procedure may at least comprise resetting of the state variables of the LLC link in the MS, i.e. the transmission state variable V(S), acknowledgement state variable V(A), transmission sequence number N(S), receiving state variable V(R) and receiving sequence number N(R) are set to value zero. It is also possible to set LLC link parameters to their default values. Such LLC link parameters include the maximum delay (T200) of the acknowledgement response of a data frame, maximum number (N200) of retransmissions of a frame, maximum number (N201) of octets in the information field of a frame, and maximum number of sent unacknowledged frames, i.e. the size of the acknowledgement window is K. Resetting of state variables according to the invention also comprises a timer measuring the delay T200 and resetting of a retransmission counter N200. In general, it can be said that the update of a logical link comprises all necessary initializations in different protocol layers in the MS. The SGSN carries out the necessary actions independently at its own end. As regards the SGSN, the LLC link has been established in the same way immediately after the SGSN has sent a Routing Area Update Accept message to the MS. Therefore, the logical link is ready for data transmission as soon as the MS has locally performed resetting and initialization.

11. In another embodiment of the invention the SGSN also includes information on the fact that the MS should initiate the activation of one or more PDP contexts in the Routing Area Update Accept message. The SGSN adds this information at least when the retrieval of the old PDIP context from the old SGSN has failed. For this purpose, a 2-bit field, for example, can be included in the Routing Area Update Accept message (e.g. in the existing Cause field); in the field "11" means "SGSN has changed, activate PDP contexts"
"10" means "SGSN has changed"
"00" means "SGSN has not changed".

As the MS receives the information "11", it updates the logical link as was described above and initiates the activation of the PDP context by sending one or more "Activate PDP Context Request" messages to the SGSN. If the MS receives the information "10", it only updates the logical link. If the MS receives the information "00", it does not even update the logical link.

In the above embodiments information on the change of the SGSN is relayed in a message of the MM layer, such as Routing Area Update Accept. In that case the control unit of the MM layer analyzes the information field in the MS and, if necessary, commands the LLC layer to update the logical link. In this case both the data transmission according to the invention and the update of a logical link are independent of the signalling of the LLC layer. In principle, information on the change of the SGSN can also be transmitted in messages of another protocol layer.

12. In the above example the SGSN does not inform the MS of the change of the SGSN until the MM context has been retrieved from the old SGSN. However, the SGSN can also send the information earlier so that the MS knows to discontinue data transmission. This has been illustrated in FIG. 3 with a message "SGSN Changed". Alternatively, the MS can always discontinue data transmission in connection with a routing area update, but this causes unnecessary interruptions to data transmission in connection with the intra-SGSN update.

13. In the above examples the MS, having received information on the change of the SGSN, resets state variables and initializes a logical link locally. Alternatively, the MS can initiate a signalling procedure for re-establishing the link. Compared to the first embodiment of the invention, a disadvantage associated with the present embodiment is that signalling increases in the radio interface.

In an embodiment of the invention the MS initiates a procedure of the LLC layer for resetting the logical link at both ends. For this purpose the MS sends a SABM command (set asynchronous balanced mode) according to the LAPG protocol to the SGSN. In response to receiving the SABM command the SGSN sets the V(S), V(A) and V(R) to value 0. The SGSN sends an UA response (unnumbered acknowledged response) to the MS. Having received the UA, the MS resets the state variables and initializes a logical link. The initialization of a logical link also preferably comprises setting LLC link parameters T200, N200, N201 and K to their default values.

In a further embodiment of the invention the MS resets the state variables of the logical link and initiates a procedure of the LLC layer in which the MS and the SGSN negotiate said LLC link parameters. For this purpose, the MS sends a XID command according to the LAPG protocol to the SGSN, the command including a parameter message. The parameter message contains the values requested by the MS for the LLC link parameters T200, N200, N201 and K. The SGSN sends a XID response including a list of the parameter values supported by the SGSN. The MS and the SGSN set these values to the parameters.

Instead of the above-mentioned message pairs, other message pairs can also be used.

14. The kind of network procedure described in item 13 for initializing a logical link can also be initiated after message 12. This allows to establish a logical link before the Routing Area Update Accept message, and data transmission can be started immediately thereafter.

In another embodiment of the invention information on the basis of which the MS can conclude whether a new cell or routing area is related to the same SGSN as the old cell or routing area or to a different one is transmitted on the broadcast control channel of the cells of a packet radio network. In both cases the MS sends a routing area update request. If the MS has detected that the SGSN changes, it initiates a local procedure or the above-mentioned network procedure for updating a logical link between the MS and the new SGSN at some point after the routing area request has been sent. All methods and procedures described in connection with previous embodiments can be used for updating a logical link. The major difference between the present embodiment and the previous ones is that the information is transmitted on the broadcast control channel and is available before the crossover, if necessary. With respect to the invention it is not essential when the MS analyzes the broadcast SGSN information, i.e. whether it is analyzed before or after sending the routing area request.

Since the SGSN information is available before the crossover, if necessary, the MS (or the network in some systems) may utilize the support node information transmitted on the broadcast control channel also when deciding to which cell it should roam as the signal of the current cell fades out. For example, the mobile station can select the cell having a weaker signal strength from two cells on the basis of signal strength measurements if that cell is within the same packet radio support node as the current serving cell (or even the same cell, in which case crossover to a new cell is not performed or is at least delayed). A crossover criterion may include a parameter indicating how much lower signal strength or quality is allowed for a cell within the same SGSN compared with a cell within another SGSN. Using the support node information as one criterion for deciding on crossover allows to avoid unnecessary change-overs between packet radio support nodes as well as signalling load due to change-overs on the radio path and between the packet network elements.

Said information indicating the change of the SGSN may be an identifier which uniquely identifies a packet radio node, or a "colour code", adjacent packet radio support nodes always having different colour codes. An advantage of the colour code is that it can be inserted in a very small number of bits (compared with the identifier), and thus it does not use much of valuable radio interface resources. The information may be a new parameter field in the signalling of the BHHC channel, but an old information field can also be used so as not to increase the number of bits to be transmitted over the radio path. One existing field which is suitable for this purpose is the base station identification code BSIC. In fact, the BSIC is a "colour code", which allows mobile stations to distinguish between adjacent cells transmitting at the same broadcast frequency. The BSIC is a 6-bit code, called a network colour code NCC, the first three bits of which distinguish between countries or networks. The last three bits allow to distinguish between cells within a network. The BSIC code can be applied to the invention by giving different BSIC codes to adjacent SGSN areas, i.e. by colouring them with different colours. When the MS detects, upon the change of the routing area, that the SGSN colour code (BSIC code or part of it) also changes, it concludes that the SGSN changes and initiates procedures for updating a logical link, as was described above in connection with the other embodiments with reference to FIG. 3. Activation of PDP contexts described above can also be applied to this embodiment of the invention, as was explained in connection with the other embodiments of the invention with reference to FIG. 3.

Standardization of the GPRS system has not been completed yet. The present state of the GPRS system is described in recommendations GSM 03.60 version 0.20.0 and GSM 04.64 version 0.0.1(DRAFT) of the European Telecommunications Standards Institute (ETSI), which are incorporated herein by reference.

The description only illustrates preferred embodiments of the invention. The invention is not, however, limited to these examples, but it may vary within the scope and spirit of the appended claims.

What is claimed is:

1. A method for updating a routing area in a packet radio network, the method comprising establishing a logical link between a mobile station and a first radio support node via a radio cell, selecting a second radio cell in the mobile station, the routing area identifier broadcast by the cell being different from the routing area identifier of the first radio cell, sending a routing area update request to the second packet radio support node serving the second cell from the mobile station, detecting in the second packet radio support node that the mobile station has roamed from a routing area served by a different packet radio support node, requesting subscriber data related to the mobile station from the first packet radio support node, sending an acknowledgement message on the routing area update from the second packet radio support node to the mobile station, sending information on the change of the packet radio support node from the second packet radio support node to the mobile station, and initiating a local procedure or a network procedure for initializing a logical link between the mobile station and the second packet radio support node in the mobile station in response to the reception of said information.

2. A method as claimed in claim 1, further comprising sending said information on the change of the packet radio support node in said acknowledgement message on the routing area update.

3. A method as claimed in claim 1 or 2, wherein said local initialization of a logical link comprises setting the link parameters of the logical link to their default values in the mobile station.

4. A method as claimed in any one of claims 1 to 2, wherein said network procedure for initializing a logical link comprises sending a first message of the logical link protocol from the mobile station to the second packet radio network, resetting the state variables of the logical link in the second packet radio support node in response to said first message, sending a response message from the second packet radio support node to the mobile station, and resetting the state variables of the logical link in the mobile station.

5. A method as claimed in claim 4, wherein said paket radio network is a GPRS network, and said first message is the Set Asynchronous Balanced Mode command of the LAPG protocol, and said response message is the Unnumbered Acknowledgement response of the LAPG protocol.

6. A method as claimed in any one of claims 1 to 2, wherein said network procedure for initializing a logical link comprises performing negotiation of link parameters according to the logical link protocol between the mobile station and the second packet radio support node, setting the link parameters to the negotiated values in the mobile station and second support node, and resetting the state variables of the logical link in the mobile station.

7. A method as claimed in claim 6, wherein the packet radio network is a GPRS network, and said negotiation of link parameters comprises sending a XID command of the LAPG protocol from the mobile station to the second packet radio support node, the command including a list of the link parameter values requested by the mobile station, sending a XID response of the LAPG protocol from the second packet radio support node to the mobile station, the response including a list of the link parameter values supported by the second packet radio support node, setting the link parameter values to the values given in the XID command in the mobile station, and resetting the state variables of the logical link in the mobile station.

8. A method as claimed in claim 1 or 2, further comprising
failing to retrieve packet data protocol parameters which the mobile station has activated in the first packet radio support node from the first packet radio support node for the second packet radio support node,
sending information from the second packet radio support node to the mobile station that it should reactivate the packet data protocol parameters, and
sending a message for activating the packet data protocol parameters from the mobile station for the second packet radio support node.

9. A method as claimed in claim 8, wherein the packet radio network is a GPRS network, and said activation message is Activate PDP Context Request.

10. A method as claimed in claim 1 or 2, further comprising sending said information on the change of the packet radio support node before or at the same time as subscriber data are requested from the first packet radio support node.

11. A method as claimed in claim 10, wherein the network procedure for initializing a logical link is performed simultaneously with the retrieval of the subscriber data from the first packet radio support node.

12. A method as claimed in claim 1 or 2, wherein the packet radio network is a GPRS network, and said information is sent in a message of the mobility management protocol.

13. A method as claimed in claim 1, wherein said local initialization of a logical link comprises resetting of the state variables of the logical link in the mobile station.

14. A cellular packet radio network, comprising
mobile stations,
packet radio support nodes, which are connected to a digital cellular radio network providing a radio interface for the support nodes for packet-switched data transmission between the support nodes and mobile stations, there being a logical link between the mobile station and the serving packet radio support node,
logical routing areas, each of which comprises one or more cells in the radio network, each cell being arranged to broadcast information on the routing area to which it belongs,
the mobile stations being arranged to send a routing area update request to the packet radio network when they roam to a new cell which belongs to a different routing area than the old cell, said update request including identifiers of the old and new routing area,
the packet radio support node being arranged to request the mobile subscriber's subscriber data from the old packet radio support node upon detecting that the old routing area belongs to a different packet radio support node,
the packet radio support node being arranged to acknowledge the routing area update to the mobile station when the node has received the subscriber data,
the packet radio support node is arranged to send information on the change of the packet radio support node to the mobile station, and
the mobile station is arranged in response to the reception of said information to initiate a local procedure or a network procedure for initializing a logical link between the mobile station and the new packet radio support node.

15. A packet radio network as claimed in claim 14, wherein the acknowledgement message of a routing area update includes said information on the change of the packet radio support node.

16. A packet radio network as claimed in claim 14 or 15, wherein the packet radio network is a GPRS network, and said information is inserted in the mobility management protocol.

17. A packet radio network as claimed in claim 14 or 15, wherein the local initialization of a logical link comprises resetting the state variables of the logical link and setting the link parameters of the logical link to their default values in the mobile station.

18. A packet radio network as claimed in claim 14 or 15, wherein
said subscriber data include the packet data protocol parameters the mobile station has activated in the old packet radio support node,
the new packet radio support node is arranged to send information that it should reactivate the packet data protocol parameters in response to the unsuccessful retrieval of the subscriber data from the old packet radio support node, and
the mobile station is arranged to send a message for activating the packet data protocol parameters to the packet radio support node in response to said activation information.

19. A packet radio network as claimed in claim 14, wherein the packet radio support node is arranged to send information on the change of the packet radio support node to the mobile station before or at the same time as it retrieves subscriber data from the old packet radio support node.

20. A method for updating a routing area in a packet radio network, the method comprising
establishing a logical link between a mobile station and a first radio support node via a radio cell,
selecting a second radio cell in the mobile station, the routing area identifier broadcast by the cell being different from the routing area identifier of the first radio cell,
sending a routing area update request to the second packet radio support node serving the second cell from the mobile station,
detecting in the second packet radio support node that the mobile station has roamed from a routing area served by a different packet radio support node,
requesting subscriber data related to the mobile station from the first packet radio support node,
sending an acknowledgement message on the routing area update from the second packet radio support node to the mobile station,
transmitting on broadcast channels of the radio cells information on the basis of which the mobile station can conclude whether the new cell or routing area is related to the same packet radio support node as the old cell or routing area or to a different one, and
initiating a local procedure or a network procedure for initializing a logical link between the mobile station and the second packet radio support node in the mobile station after sending said routing area request when the mobile station concludes on the basis of said information that the packet radio support node has changed.

21. A method as claimed in claim 20, comprising
transmitting different colour codes in cells related to different packet radio support nodes.

22. A method as claimed in claim 21, wherein the packet radio network is a GPRS network, and said colour code is a base station identity code or part of it.

23. A cellular packet radio network, comprising mobile stations, packet radio support nodes, which are connected to a digital cellular radio network providing a radio interface for support nodes for packet-switched data transmission between the support nodes and mobile stations, there being a logical link between the mobile station and the serving packet radio support node, logical routing areas, each of which comprises one or more cells in the radio network, each cell being arranged to broadcast information on the routing area to which it belongs, the mobile stations being arranged to send a routing area update request to the packet network when they roam to a new cell which belongs to a different routing area than the old cell, said update request including identifiers of the old and new routing area, the packet radio support node being arranged to request the mobile subscriber's subscriber data from the old packet radio support node upon detecting that the old routing area belongs to a different packet radio support node, the packet radio support node being arranged to acknowledge the routing area update to the mobile station when the node has received the subscriber data, the radio cells are arranged to transmit on broadcast channels information on the basis of which the mobile station can conclude whether the new cell or routing area is related to the same packet radio support node as the old cell or routing area or to a different one, and the mobile station is arranged to start a local procedure or a network procedure for initializing a logical link between the mobile station and the second packet radio support node in the mobile station after sending said routing area request when the mobile station concludes on the basis of said information that the packet radio support node has changed.

24. A packet radio network as claimed in claim 23, wherein said information is a colour code transmitted on the broadcast control channel of the cell, adjacent areas of packet radio support nodes having different codes.

25. A packet radio network as claimed in claim 23, wherein said information is a unique identifier transmitted on the broadcast control channel of the cell.

26. A packet radio network as claimed in claim 23, 24 or 25, wherein the mobile station or the cellular network is arranged to use said information as one criterion for deciding on crossover.

* * * * *